United States Patent [19]
Scherer et al.

[11] Patent Number: 6,047,681
[45] Date of Patent: Apr. 11, 2000

[54] PROCESS AND APPARATUS FOR ADJUSTING THE TORQUE OF AN INTERAL-COMBUSTION ENGINE

[75] Inventors: Matthias Scherer; Hans-Hubert Hemberger, both of Esslingen, Germany

[73] Assignee: DaimlerChrysler AG, Germany

[21] Appl. No.: 08/901,453

[22] Filed: Jul. 28, 1997

[30] Foreign Application Priority Data

Jul. 26, 1996 [DE] Germany .......................... 196 30 213

[51] Int. Cl.$^7$ ............................. F02P 5/02; F02D 43/04
[52] U.S. Cl. ............................. 123/406.46; 123/406.5; 123/406.51
[58] Field of Search ............................. 123/339.11, 329, 123/406.23, 406.46, 406.5, 406.51

[56] References Cited

U.S. PATENT DOCUMENTS

| | | | |
|---|---|---|---|
| 4,981,126 | 1/1991 | Kurihara | 123/406.51 |
| 5,197,431 | 3/1993 | Takaba et al. | 123/406.5 |
| 5,579,736 | 12/1996 | Nakamura et al. | 123/406.5 |
| 5,676,111 | 10/1997 | Zhang | 123/406.23 |
| 5,829,410 | 11/1998 | Hirose | 123/406.51 |

FOREIGN PATENT DOCUMENTS

| | | |
|---|---|---|
| 39 42 966 A1 | 6/1991 | Germany . |
| 41 12 908 A1 | 10/1991 | Germany . |
| 42 15 107 C1 | 1/1994 | Germany . |
| 43 15 885 C1 | 11/1994 | Germany . |
| 44 40 640 A1 | 5/1995 | Germany . |

*Primary Examiner*—Erick R. Solis
*Attorney, Agent, or Firm*—Evenson, McKeown, Edwards & Lenahan, P.L.L.C.

[57] ABSTRACT

The invention provides a process and an apparatus for controlling the engine torque of an internal-combustion engine. A dynamic desired torque component is determined from a demanded desired engine torque, and is used to determine a corresponding displacement of the ignition point or of the injection start, while a remaining quasi-static desired torque component is regulated by a corresponding adjustment of the air flow rate or of the fuel injection duration.

19 Claims, 2 Drawing Sheets

6,047,681

PROCESS AND APPARATUS FOR ADJUSTING THE TORQUE OF AN INTERAL-COMBUSTION ENGINE

BACKGROUND AND SUMMARY OF THE INVENTION

The invention relates to a process and apparatus for adjusting the torque of an internal-combustion engine by regulating the ignition point and the air flow rate in an Otto engine, or by regulating the start and the duration of fuel injection in a diesel engine.

Modern Otto engines usually have an electronic throttle valve control system for regulating the air flow rate, in which the accelerator pedal is mechanically uncoupled from the throttle valve. To regulate the pertaining transmission line of a vehicle, modern engine—transmission management concepts use a torque interface in which the desired engine torque is normally adjusted either statically by means of a characteristic diagram which links the air flow rate, rotational engine speed and engine torque quantities, or dynamically by means of an air flow rate control. The dynamics of engine torque regulation by controlling only the air flow rate are significantly restricted by the finite speed of the throttle valve control element, and mainly by the filling characteristics of the suction pipe. However, certain engine functions, such as the idling regulating or traction upshift in the case of automatic transmissions, require a highly dynamic engine (that is, rapid) torque response, which cannot be satisfactorily achieved by the quasi-static air flow rate regulation. Conventionally, the required highly dynamic engine torque response is therefore achieved by ignition control, the resulting engine torque intervention not being coordinated with the air flow rate regulating. Such ignition control usually consists of a slight displacement of the ignition point, which is predetermined as a function of the engine operating point. In the case of diesel engines with electronic fuel injection, the demanded engine torque is conventionally adjusted exclusively by a corresponding selection of the injection duration, while the injection start is normally predetermined as a function of the engine operating point.

German Patent Document DE 42 15 107 C1 discloses a process for controlling an internal-combustion engine in which a desired value for the torque transmitted to the road is determined from the angular position of the accelerator pedal. Taking into account the transmitting function of the engine and of the transmission line, the fuel quantity to be injected into the internal-combustion engine is determined from this desired value. Based on the fuel quantity to be injected, a desired value is then determined for the required air flow rate taking into account a desired value for the fuel/air ratio, by inverting a predetermined suction pipe dynamics function. The air flow rate is then regulated by the corresponding adjustment of a throttle valve control element. The fuel quantity actually injected is then determined by means of the measured actual air flow rate.

German Published Patent Document DE 44 40 640 A1 discloses a process for transient control of an internal-combustion engine, which takes into account the accumulating effect of the suction pipe. For this purpose, a control unit uses an air flow rate density function (filed in a memory) to generate a value for the air flow rate at the cylinder input as a function of the suction pipe air density and the rotational engine speed. From this value a pertaining engine load value is then determined.

A fuel control unit for an internal-combustion engine disclosed in German Patent Document DE 41 12 908 A1 achieves a fast fuel control response during an engine acceleration without a reduction of the engine output torque, by following up the first injection calculated on the basis of the intake air temperature and of the internal cylinder pressure, with a second injection quantity which is calculated on the basis of the engine acceleration condition.

A device for controlling and/or regulating the fuel metering and/or the ignition angle of an internal-combustion engine disclosed in German Patent Document DE 39 42 966 A1 is designed so that, in the steady-state operation, the measuring value of a periodically fluctuating quantity (for example, the suction pipe pressure) which is crank-angle-synchronously measured once per ignition, is used always at the same crankshaft position for controlling or regulating the fuel metering or the ignition angle. In dynamic operation, on the other hand, every measuring value is used for controlling or regulating the fuel metering or the ignition angle. As a result, the transition from steady-state to dynamic engine operation can be recognized very rapidly, and can be taken into account in adjusting the fuel metering or the ignition angle.

German Patent Document DE 43 15 885 C1 discloses a process for adjusting the desired output torque of an internal-combustion engine, in which a desired engine load value is determined from the desired output torque, as a function of the rotational engine speed and the throttle valve opening angle. The measured actual value is regulated to the desired value by adjusting of the throttle valve control element. Conversion between regulation of the load and regulation of the air flow rate takes place by means of a load filter, which compensates the deviations of the measured air flow rate occurring in dynamic operating conditions from the air flow rate actually flowing into the combustion space. The transition between the two types of regulation can take place in a continuous or switched manner, preferably by using a one-sided hysteresis during the change-over from engine load regulation to air flow rate regulation.

One object of the present invention is to provide a process and apparatus of the initially mentioned type which adjusts the engine torque to a desired value with the least possible expenditures in both steady-state and transient engine operation with a comparatively short reaction time.

Another object of the invention is to ensure an engine operation with optimal fuel consumption and the exhaust gas emissions.

These and other objects and advantages are achieved by the torque adjustment process and apparatus according to the invention, in which the demanded desired engine torque is split into a dynamic component and a remaining quasi-static component. The dynamic component is used to determine corresponding adjustment of the ignition point in the case of an Otto engine or of the injection start in the case of a diesel engine. That is, the dynamic component is used as a command variable for a desired-engine-torque-dependent displacement of the ignition point or of the injection start, while the quasi-static desired torque component is regulated by means of a corresponding adjustment of the air flow rate (for an Otto engine) or of the injection duration (a diesel engine). In order to achieve minimal exhaust emission and fuel consumption, variation of the ignition point or of the injection start is expediently kept as small as possible. This means that the dynamic desired torque component represents exactly that part of the demanded desired engine torque which cannot be adjusted by the quasi-statically (that is, more sluggishly) reacting air flow rate or injection duration adjustment alone. Therefore, the present invention permits optimal coordination of quasi-static engine torque adjustment (by way of air flow rate and injection duration regulation) on the one hand, and highly dynamic engine torque adjustment (by regulating the ignition point or the injection start), on the other hand.

In a preferred embodiment of the invention, the dynamic desired torque component is determined by high-pass filtering of the demanded desired engine torque with a decay time constant which is selected as a function of the engine operating point.

In another preferred embodiment, a model-based estimation is made of the quasi-static desired torque component achieved by air flow rate or injection duration regulation. To obtain the dynamic desired torque component, the estimated value is subtracted from the demanded desired engine torque. In the simplest case, the model can be formed by a characteristic diagram of the quasi-static actual torque component as a function of rotational engine speed, engine cooling water temperature and, in the case of an Otto engine, the engine load and ignition point or, in the case of a diesel engine, the fuel quantity (and thus of the injection duration) and the injection start.

Other objects, advantages and novel features of the present invention will become apparent from the following detailed description of the invention when considered in conjunction with the accompanying drawings.

DETAILED DESCRIPTION OF THE DRAWINGS

FIGS. 1 to 4 are block diagrams which show different devices for adjusting the engine torque in the case of Otto or diesel engines. For a better understanding, the mutually functionally corresponding components and the same physical quantities have the same reference symbols in the various figures.

Figure 1:
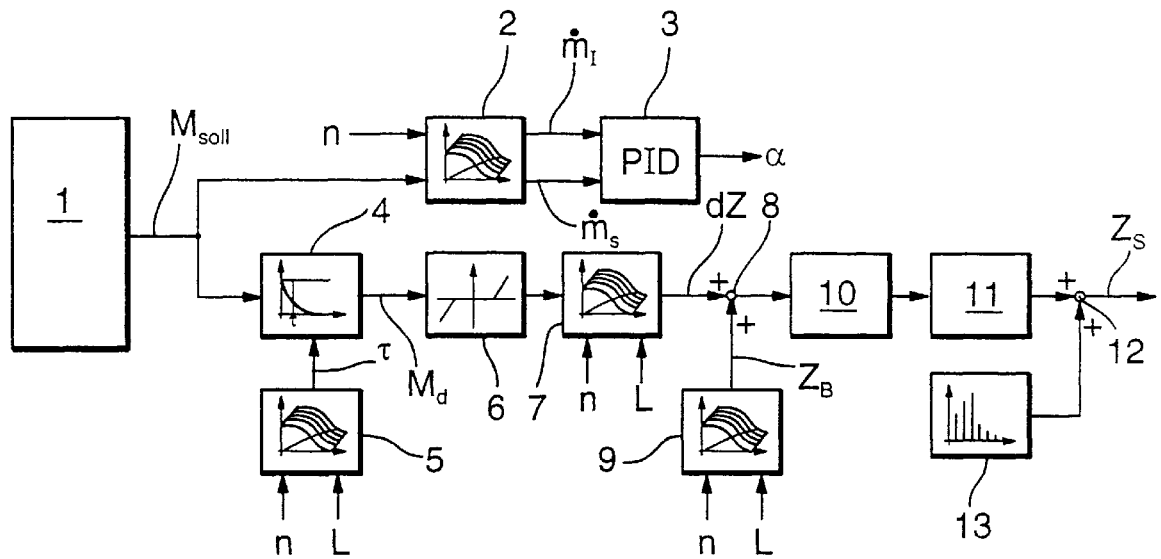
FIG. 1 is a block diagram of a device according to the invention for engine torque adjustment in an Otto engine which determines a dynamic desired torque component by high-pass filtering.

FIG. 1 illustrates a device for adjusting engine torque which is suitable for an Otto engine. On the input side, an engine torque coordination unit 1 provides a signal indicative, for example, of the desired engine torque ($M_{des}$) requested by the driver via the accelerator pedal. This desired engine torque signal ($M_{des}$) is, on the one hand, supplied to a device for regulating the air flow rate and to a high pass filter which is connected in front of a device for adjusting the ignition point. The device for regulating the air flow rate includes an input-side air flow rate calculating unit 2 and an adjoining PID air flow rate regulator 3. The air flow rate calculating unit 2 receives information concerning the momentary rotational engine speed (n) as well as the demanded desired engine torque ($M_{des}$), and uses this information to calculate a desired air flow rate value ($\dot{m}_s$), based on a stored characteristic diagram.

In addition, the air flow rate calculating unit 2 also detects the actual air flow rate value ($\dot{m}_I$) by way of a corresponding sensor system, and transmits both the actual value ($\dot{m}_I$) and the associated desired value ($\dot{m}_s$) to the PID air flow rate regulator 3 which determines therefrom a suitable control signal ($\alpha$) for an air-flow-rate-regulating throttle valve. As is well known, because of the finite throttle valve adjusting speed and mainly because of the suction pipe filling characteristics, engine torque cannot be adjusted in this manner to follow a highly dynamic desired engine torque change without a noticeable sluggishness. That is, it can adjust only a quasi-static desired engine torque part.

In order to adjust the dynamic desired torque component which exceeds this quasi-static part, an ignition point adjusting branch, with the input-side high-pass filter, is provided in parallel to the air-flow-rate-regulating branch. The ignition point adjusting branch is able to react very rapidly to sudden changes of the engine torque; however, in order to minimize exhaust emissions and fuel consumption, the ignition point displacement implemented by this branch must be kept as low as possible. This means that the ignition point adjusting branch is used only to adjust specifically that dynamic desired engine torque component which cannot be regulated by the air-flow-rate-regulating branch. The high pass filter stage, which precisely determines this dynamic desired torque component ($M_d$), consists of a high pass filter 4 with an adjustable decay time constant ($\tau$), and a characteristic time constant diagram unit 5 which indicates the decay time constant (2) for the high pass filter 4 by means of a stored characteristic diagram, as a function of the rotational engine speed (n) and of the engine load (L). For example, in the case of a higher rotational engine speed (n), a larger decay time constant ($\tau$) is provided. As a result, the high pass filter 4 filters the dynamic desired engine torque part ($M_d$), as a function of the engine operating point, from the desired engine torque ($M_{des}$) supplied to it, and in turn provides the dynamic desired engine torque ($M_d$) to the device for the ignition point adjustment which follows. Due to the high pass characteristic of the high pass filter stage, after the decay of the transients during a change of the engine torque desire, and at a constant engine load, the dynamic desired torque component ($M_d$) will completely disappear. This ensures a return of the engine operating condition to the optimal range, for both consumption and emission.

The device for the ignition point adjustment receives the dynamic desired torque component ($M_d$) from the high pass filter 4, by way of an input-side dead zone unit 6 which suppresses very small ignition point changes. Thereafter, unit 7 determines an ignition point displacement (dZ) which corresponds to the supplied dynamic desired torque component ($M_d$) as a function of the rotational engine speed (n) and of the engine load (L), by means of a stored characteristic diagram. An adder 8 adds this ignition point displacement (dZ) to an ignition point base value ($Z_B$) determined by an ignition point calculating unit 9 by means of a stored characteristic diagram as a function of the rotational engine speed (n) and of the engine load (L). A unit 10 limits the rate of change of the ignition point value supplied by the Adder 8 to a predeterminable extent, and a unit 11 limits its absolute value; that is, the unit 11 limits the ignition point value to a predeterminable maximum. The resulting ignition point adjusting signal is supplied to an adder 12 which adds it to the output signal of a conventional knock regulating stage 13. The output signal of the adder 12 is then used as an adjusting signal ($Z_S$) for the ignition point adjustment. It is understood that the ignition point can be expressed as an ignition angle relative to a reference angle, for example, the top of dead center of piston of a reciprocating piston engine.

The embodiment of FIG. 1 therefore permits a comparatively rapid engine torque adjustment which can follow very fast desired engine torque changes, and after the conclusion of a transient phase changes back comparatively rapidly to an operation which is optimal with respect to exhaust emissions and fuel consumption.

Figure 2:
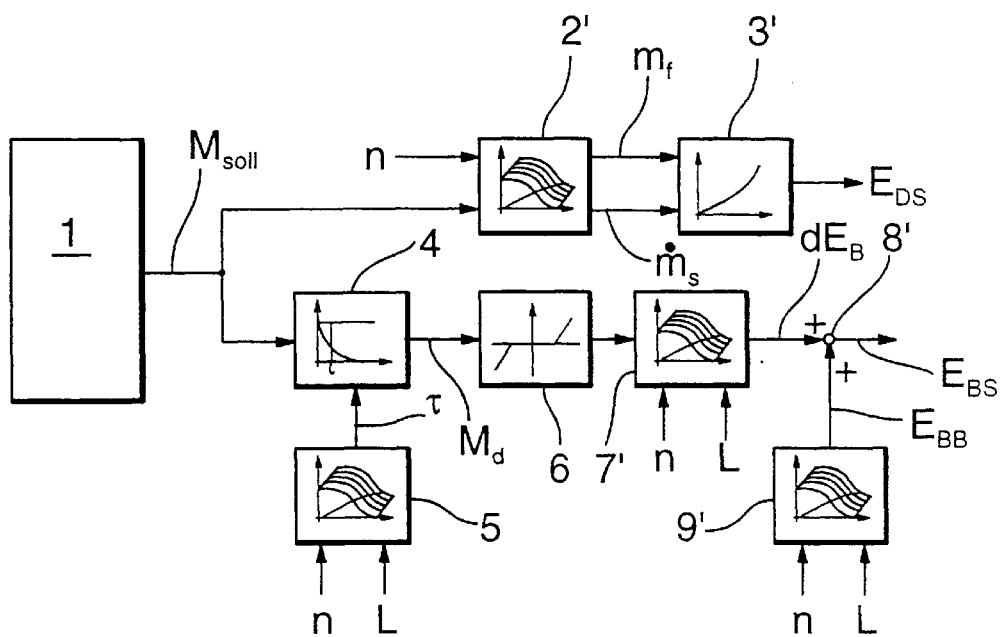
FIG. 2 is a block diagram of a device according to the invention for engine torque adjustment in a diesel engine which determines a dynamic desired torque component by high-pass filtering.

FIG. 2 shows a device which is functionally analogous to that of FIG. 1 and which is suitable for a diesel fuel engine with an electronic diesel injection. To the extent that the same components and physical quantities are shown here as in FIG. 1, which is recognizable by the use of the same reference symbols, reference can be made concerning their description to statements concerning FIG. 1. As a modification, instead of an air flow rate regulating device, a device for adjusting the fuel injection duration is provided, which comprises a unit 2' for calculating the fuel flow rate and a unit 3' for calculating the injection duration. The fuel flow rate calculating unit 2' determines the fuel flow rate ($\dot{m}_f$) by means of a stored characteristic diagram, as a function of the supplied rotational engine speed (n) and the supplied desired engine torque ($M_{des}$). From the fuel flow rate value ($\dot{m}_f$) supplied to it, the injection duration calculating unit 3' determines a corresponding injection duration by means of a stored characteristic curve, and emits this information as an injection duration adjusting signal ($E_{DS}$).

Instead of the ignition point adjusting branch of the device of FIG. 1, the device of FIG. 2 contains an injection start adjusting branch. The high pass filter stage 4, 5 which is connected at the head of this branch has a decay time constant (2) that can be adjusted as a function of the engine operating point. The dead zone unit 6 (analogous to FIG. 1) is followed by a unit 7' which determines an injection start displacement ($dE_B$) corresponding to the dynamic desired engine torque component ($M_d$), by means of a stored characteristic diagram, as a function of the rotational engine speed (n) and of the engine load (L). The determined injection start displacement ($dE_B$) is added in an adder 8', to an injection start base value ($E_{BB}$) which is calculated by an injection start determination unit 9' by means of a stored characteristic diagram as a function of the rotational engine speed (n) and the engine load (L). The output signal of the adder 8' is used as the injection start adjusting signal ($E_{BS}$). It is understood that the injection start can be represented as a injection start angle relative to a reference angle, for example, the top of dead center of a particular piston of a reciprocating piston engine.

The method of operation of the device of FIG. 2 and the resulting advantageous effects correspond to those of the device of FIG. 1, to which reference is made here. The comparatively rapidly reacting injection start adjusting branch regulates precisely that dynamic desired engine torque part ($M_d$) which cannot be regulated by the more sluggish, that is, quasi-statically reacting, device for adjusting the injection duration in the case of sudden changes of the desired engine torque. After the termination of a transient phase, the system changes comparatively rapidly back to the method of operation in which the engine torque is adjusted only by way of a corresponding adjustment of the injection duration, and which is optimal with respect to the exhaust gas emissions and the fuel consumption.

FIG. 3 again shows a device which is suitable for torque adjustment of an Otto engine. This embodiment corresponds to that of FIG. 1 except that, instead of the high pass filter stage, a model-based estimated value stage is provided to determine the dynamic desired engine torque component ($M_d$) that cannot be regulated by the air flow rate regulation, by estimating the quasi-static engine torque part ($M_{IS}$) which can be adjusted by the air flow rate regulation. With respect to the remaining components, reference can be made to the description of FIG. 1.

The estimated value stage contains an estimated value determination unit 14 and a subtractor 15. The estimated value determination unit 14 estimates the quasi-static engine torque part ($M_{IS}$) which can be controlled by the air flow rate regulating branch, by means of a stored model for the air flow rate regulation as a function of the supplied actual values of the rotational engine speed (n), the engine load (L), the engine cooling water temperature ($T_K$) and the ignition point adjusting signal ($Z_S$). In the simplest case, this model comprises a characteristic diagram which determines the quasi-static engine torque part ($M_{IS}$) of the air flow rate regulation as a function of the four mentioned input quantities. The estimated value ($M_{IS}$) for the quasi-static engine torque part is subtracted by means of the subtracting device 15 from the demanded desired engine torque ($M_{des}$), and the resulting difference is transmitted to the dead zone unit 6 as the dynamic desired engine torque part ($M_d$) to be regulated by the ignition point adjusting branch.

Figure 3:
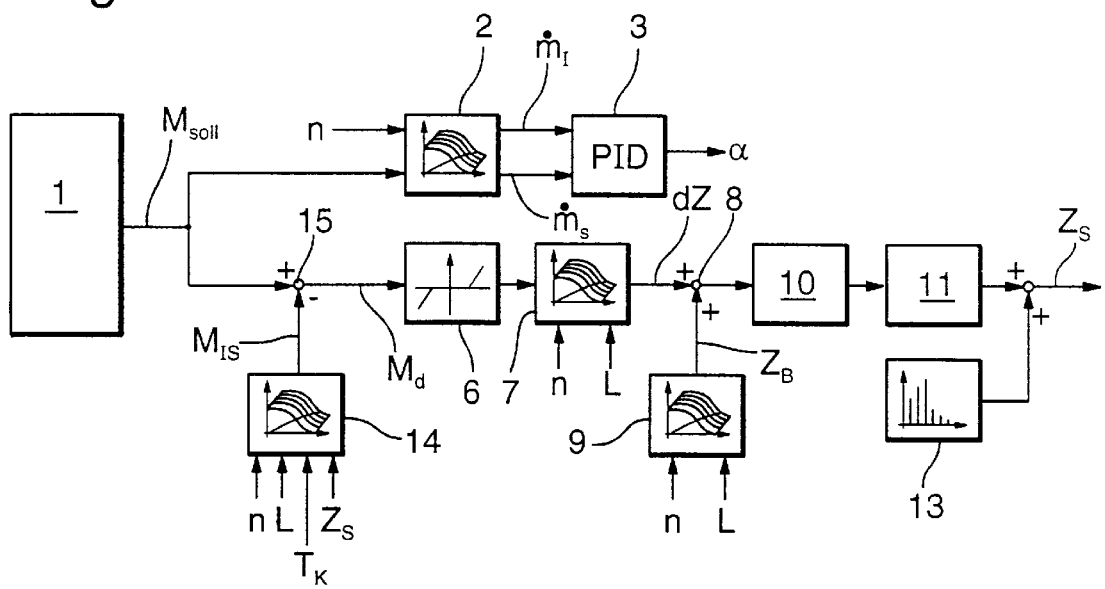
FIG. 3 is a block diagram of a device for engine torque adjustment in an Otto engine which determines a dynamic desired torque component using a model-based estimate of a quasi-static actual torque component.

The method of operation of the embodiment of FIG. 3, and the advantageous effects achievable thereby, correspond to those of the embodiment of FIG. 1, to which reference can be made here. In particular, by means of this device, the dynamic desired torque component which was not adjusted by the air flow rate regulation can be considerably reduced directly by a suitable change of the ignition point. The characteristic diagram stored in the unit 7 for calculating the ignition point displacement can easily be applied because the ignition point displacement required for an engine torque change at a particular operating point can be determined in a steady-state manner on an engine test bench.

Figure 4:
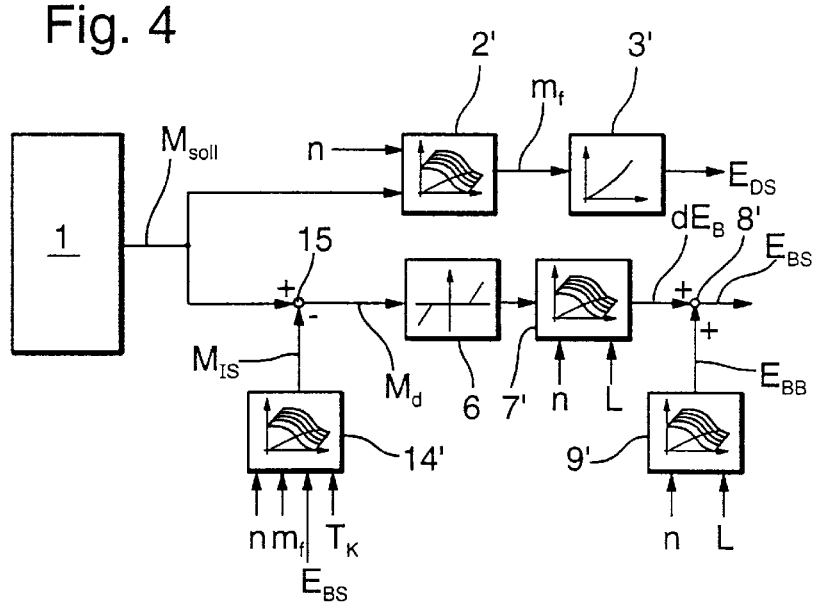
FIG. 4 is a block diagram of a device according to the invention for engine torque adjustment in a diesel engine which determines a dynamic desired torque component using a model-based estimate of a quasi-static actual torque component.

The embodiment of FIG. 4, which is adapted for a diesel engine, is identical with that of FIG. 2 except that, instead of the high pass filter stage, (analogously to the modification of FIG. 3 in comparison to that of FIG. 1), an estimated value stage is provided. This estimated value stage corresponds essentially to that of FIG. 3. It contains a modified estimated value determination unit 14' which estimates the quasi-static engine torque ($M_{IS}$) which can still be mastered by the injection duration adjusting branch, by means of a stored model as a function of the supplied rotational engine speed (n), the fuel flow rate ($\dot{m}_f$), the injection start adjusting signal ($E_{BS}$) and the engine cooling water temperature ($T_K$) quantities. The estimated value ($M_{IS}$) is then subtracted in the subtractor device 15 from the demanded desired engine torque ($M_{des}$), and the resulting difference signal is treated as the dynamic desired engine torque part ($M_d$) which is to be regulated by the injection start adjusting branch and is supplied to the dead zone unit 6. The method of operation of the device of FIG. 4, and the advantages achieved by means of it, otherwise correspond to those of the device according to FIG. 2, to which reference can be made here.

Figure 5:
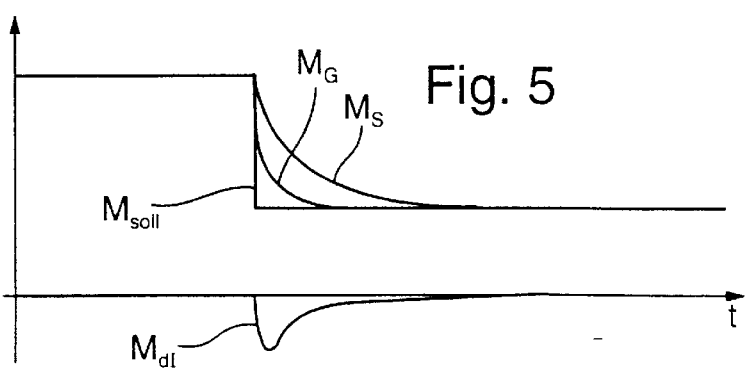
FIG. 5 is a diagram which illustrates the operation of the devices of FIGS. 1 to 4 in the case of a sudden change of the desired engine torque.

FIG. 5 which illustrates the operation of the embodiments of FIGS. 1 to 4, shows an example of the engine torque (M) as a function of time (t). At a defined point in time, an abrupt reduction occurs of the demanded desired engine torque ($M_{des}$). The quasi-static engine torque part ($M_S$), which can be controlled by the quasi-statically reacting air flow rate regulating branch or injection duration adjusting branch, follows the abrupt desired torque change only comparatively slowly. In contrast, the ignition point adjusting branch (or the injection start adjusting branch) reacts very rapidly and supplies a dynamic engine torque part ($M_{dI}$) which follows the abrupt desired engine torque change very rapidly.

The engine torque ($M_G$), which is adjusted as a whole by the respective device, is additively composed of the dynamic ($M_{dI}$) and the quasi-static engine torque component ($M_S$) and in this manner follows the abrupt desired engine torque change much better than the quasi-static engine torque component by itself ($M_S$). As soon as the adjusted overall engine torque ($M_G$) has approximately reached the now reduced desired engine torque value ($M_{des}$), the dynamic engine torque part ($M_{dI}$) caused by the ignition point adjusting branch (or the injection start adjusting branch) returns relatively rapidly to zero. Thereafter the engine torque adjustment to the subsequent quasi-static desired engine torque value ($M_{des}$) is again taken over solely by the air flow rate regulating branch (or by the injection duration adjusting branch) in a manner which is optimal with respect to the exhaust gas emissions and the fuel consumption. An analogous method operation is naturally obtained for highly dynamic increases of the desired engine torque.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Process for controlling engine torque of an internal-combustion engine in response to a demanded desired engine torque signal, comprising:

determining a dynamic desired torque component ($M_d$), from said demanded desired engine torque ($M_{des}$);

determining a corresponding ignition point displacement (dZ) based on the dynamic desire torque component ($M_d$);

adjusting an ignition point of said engine in response to said ignition point displacement; and adjusting a remaining quasi-static desired torque component by a corresponding adjustment of the air flow rate of said engine;

wherein said determining of a dynamic desired torque component ($M_d$) comprises high pass filtering of the demanded desired engine torque ($M_{des}$) by means filter having a decay time constant (2) predetermined as a function of an engine operating point of said engine.

2. Process for controlling engine torque of an internal-combustion engine in response to a demanded desired engine torque signal, comprising:

determining a dynamic desired torque component ($M_d$), from said demanded desired engine torque ($M_{des}$);

determining a corresponding ignition point displacement (dZ) based on the dynamic desire torque component ($M_d$);

adjusting an ignition point of said engine in response to said ignition point displacement; and adjusting a remaining quasi-static desired torque component by a corresponding adjustment of the air flow rate of said engine;

wherein the quasi-static desired torque component which can be adjusted by adjustment of the air flow rate is estimated by means of an air flow rate model, and the dynamic desired torque component ($M_d$) is determined by subtraction of an estimated value from the demanded desired engine torque ($M_{des}$).

3. Process for controlling engine torque of an internal-combustion engine in response to a demanded desired engine torque signal, comprising:

determining a dynamic desired torque component ($M_d$) from said demanded desired engine torque ($M_{des}$);

determining a corresponding injection start displacement ($dE_B$) based on the dynamic desired torque component ($M_d$);

adjusting an injection start of said engine in response to said injection start displacement; and adjusting a remaining quasi-static desired torque component by a corresponding adjustment of the injection duration of said engine.

4. Device for controlling engine torque of an internal-combustion engine in response to a demanded desired engine torque signal, comprising:

a device for demanding a desired engine torque ($M_{des}$);

a device for adjusting an air flow rate of said engine;

a device for adjusting an ignition point of said engine; and a device for determining a dynamic desired torque component ($M_d$) of the demanded desired engine torque ($M_{des}$) which cannot be regulated by the device for adjusting the air flow rate, the determined dynamic desired torque component being supplied to the device for adjusting the ignition point as an indication of a corresponding displacement of the ignition point.

5. Device for controlling the engine torque in the case of an internal-combustion engine in response to a demanded desired engine torque signal, comprising:

a device for demanding a desired engine torque ($M_{des}$)

a device for adjusting a fuel injection duration of said engine;

a device for adjusting a fuel injection start of said engine; and a device for determining a dynamic desired torque component ($M_d$) of the demanded desired engine torque ($M_{des}$) which cannot be regulated by the device for adjusting the fuel injection duration, the determined dynamic desired torque component being supplied to the device for adjusting the injection start as an indication for a corresponding displacement of the injection start of said engine.

6. Process for controlling engine torque of an internal combustion engine in response to a demanded desired engine torque signal by adjusting a first engine operating parameter to which said engine torque has a relatively rapid response, and a second engine operating parameter to which said engine torque has a relatively slower response, said processing comprising:

determining a first dynamic component of said demanded desired engine torque;

determining a second, remaining quasi-static component of said demanded desired engine torque;

adjusting said first engine operating parameter based on said first component of said demanded desired engine torque, independently of said second component; and adjusting said second engine operating parameter based on said second component of said demanded desired engine torque, independently of said first component.

7. Apparatus for controlling engine torque of an internal combustion engine in response to a demanded desired engine torque signal by adjusting a first engine operating parameter to which said engine torque has a relatively rapid response, and a second engine operating parameter to which said engine torque has a relatively slower response, said apparatus comprising:

means for determining a first dynamic component of said demanded desired engine torque means for determining a second, remaining quasi-static component of said demanded desired engine torque;

means for adjusting said first engine operating parameter based on said first component of said demanded desired engine torque, independently of said second component; and means for adjusting said second engine operating parameter based on said second component of said demanded desired engine torque, independently of said first component.

8. A method of controlling engine torque of an internal combustion engine in response to a demanded desired engine torque signal corresponding a desired engine torque, comprising:

adjusting a quasi-static desired torque component by a corresponding adjustment of an intake air flow rate of said engine in response to said desired engine torque signal;

determining a portion of said desired engine torque which cannot be regulated by adjustment of the intake air flow rate;

determining a dynamic desired torque component corresponding to said determined portion of said desired engine torque;

adjusting an ignition point of said engine in response to said dynamic desired torque component, independently of quasi-static component.

9. Process according to claim 3, when said step of determining a dynamic desired torque component ($M_d$) comprises high pass filtering of the demanded desired engine torque ($M_{des}$) by means filter having a decay time constant (2) predetermined as a function of an engine operating point of said engine.

10. Process according to claim 3 wherein the quasi-static desired torque component which can be adjusted by adjustment of the fuel injection duration is estimated by means of a fuel injection duration model, and the dynamic desired torque component ($M_d$) is determined by subtraction of an estimated value from the demanded desired engine torque ($M_{des}$).

11. Device according to claim 4, where the device for determining the dynamic desired torque component ($M_d$) comprises a high pass filter stage which has a decay time constant ($\tau$) that can be changed as a function of an operating point of said engine.

12. Device according to claim 4, wherein the device for determining the dynamic desired torque component ($M_d$) comprises an estimation unit which uses a stored model to estimate a quasi-static engine torque component which can be regulated by the device for adjusting the air flow rate, and determines the dynamic desired torque component ($M_d$) by subtraction of estimated values from the demanded desired engine torque ($M_{des}$).

13. Device according to claim 5, wherein the device for determining the dynamic desired torque component ($M_d$) contains a high pass filter stage which has a decay time constant (2) that can be changed as a function of an operating point of said engine.

14. Device according to claim 5, where the device for determining the dynamic desired torque component ($M_d$) comprises an estimation unit which uses a stored model to estimate a quasi-static engine torque component which can be regulated by the device for adjusting the injection duration, and determines the dynamic desired torque component ($M_d$) by subtraction of estimated values from the demanded desired engine torque ($M_{des}$).

15. Process according to claim 6 where said internal combustion engine is an Otto engine, said first engine operating parameter is air flow rate to said engine, and said second engine operating parameter is an engine ignition point.

16. Process according to claim 6 where said internal combustion engine is a Diesel engine, said first engine operating parameter is fuel injection duration, and said second engine operating parameter is a fuel injection starting point.

17. Process according to claim 6 where said step of determining said second component of said desired engine torque comprises subtracting said first component from said desired engine torque.

18. Apparatus according to claim 7 where said internal combustion engine is an Otto engine, said first engine operating parameter is air flow rate to said engine, and said second engine operating parameter is an engine ignition point.

19. Process according to claim 7 where said step of determining said second component of said desired engine torque comprises means for subtracting said first component from said desired engine torque.

* * * * *